(12) United States Patent
Mochizuki et al.

(10) Patent No.: US 10,677,351 B2
(45) Date of Patent: Jun. 9, 2020

(54) SHIFT DEVICE

(71) Applicant: KABUSHIKI KAISHA TOKAI-RIKA-DENKI-SEISAKUSHO, Aichi-ken (JP)

(72) Inventors: Shuichi Mochizuki, Aichi-ken (JP); Munetoshi Makimura, Aichi-ken (JP)

(73) Assignee: KABUSHKI KAISHA TOKAI-RIKA-DENKI-SAISAKUSHO, Aichi-Ken (JO)

(*) Notice: Subject to any disclaimer, the term of this patent is extended or adjusted under 35 U.S.C. 154(b) by 0 days.

(21) Appl. No.: 15/845,409

(22) Filed: Dec. 18, 2017

(65) Prior Publication Data

US 2018/0180176 A1 Jun. 28, 2018

(30) Foreign Application Priority Data

Dec. 26, 2016 (JP) .................. 2016-251699

(51) Int. Cl.
| | |
|---|---|
| *F16H 61/22* | (2006.01) |
| *F16H 59/08* | (2006.01) |
| *G05G 5/00* | (2006.01) |
| *G05G 5/04* | (2006.01) |

(Continued)

(52) U.S. Cl.
CPC ............. *F16H 61/22* (2013.01); *F16H 59/08* (2013.01); *G05G 5/005* (2013.01); *G05G 5/04* (2013.01); *F16H 59/54* (2013.01); *F16H 2059/081* (2013.01); *F16H 2061/223* (2013.01); *F16H 2061/326* (2013.01)

(58) Field of Classification Search
CPC .... F16H 59/02; F16H 2059/081; F16H 61/22; F16H 2061/223; G05G 1/04; G05G 1/10; G05G 5/00; G05G 5/005; G05G 5/04
USPC ................ 74/473.12, 473.21, 473.24, 473.3; 180/336
See application file for complete search history.

(56) References Cited

U.S. PATENT DOCUMENTS

| | | | |
|---|---|---|---|
| 7,971,498 B2 * | 7/2011 | Meyer .................... | B60K 37/06 200/19.18 |
| 9,334,949 B2 * | 5/2016 | Fett ......................... | F16H 59/08 |

(Continued)

FOREIGN PATENT DOCUMENTS

| | | |
|---|---|---|
| EP | 3021009 A1 | 5/2016 |
| JP | 2016-094082 A | 5/2016 |

(Continued)

OTHER PUBLICATIONS

Extended European Search Report issued in the corresponding EP Application No. 17208907.0 dated Apr. 30, 2018.

*Primary Examiner* — Bobby Rushing, Jr.

(74) *Attorney, Agent, or Firm* — Roberts Calderon Safran & Cole P.C.

(57) ABSTRACT

In a transmission mechanism, a motor is driven to rotate a rotation shaft, thereby rotating a rotor cam and a lock gear through a worm gear, a helical gear, and an intermediate gear. A cam is rotated integrally with the lock gear, thereby causing a lock bar to move to a position to restrict rotation of a knob and to a position to release rotation-restriction of the knob. A magnet is provided at the lock gear, and the magnet rotates integrally with the lock gear. Accordingly, the position of the rotor cam and the position of the lock bar can be detected from the position of the magnet.

8 Claims, 4 Drawing Sheets

(51) Int. Cl.
*F16H 59/54* (2006.01)
*F16H 61/32* (2006.01)

(56) References Cited

U.S. PATENT DOCUMENTS

| | | | |
|---|---|---|---|
| 2009/0107287 A1* | 4/2009 | Seki | B60K 37/06 |
| | | | 74/504 |
| 2010/0013621 A1* | 1/2010 | Kazyaka | F16H 59/0278 |
| | | | 340/456 |
| 2015/0027861 A1* | 1/2015 | Hoskins | F16H 59/08 |
| | | | 200/43.11 |
| 2015/0167827 A1 | 6/2015 | Fett et al. | |
| 2015/0369358 A1* | 12/2015 | Lee | F16H 59/08 |
| | | | 74/507 |
| 2016/0245403 A1 | 8/2016 | Rake et al. | |

FOREIGN PATENT DOCUMENTS

| | | | | |
|---|---|---|---|---|
| WO | WO-2013123375 A2 * | 8/2013 | | F16H 59/08 |
| WO | 2015055370 A1 | 4/2015 | | |

\* cited by examiner

SHIFT DEVICE

CROSS-REFERENCE TO RELATED APPLICATION

This application claims priority under 35 USC 119 from Japanese Patent Application No. 2016-251699 filed Dec. 26, 2016, the disclosure of which is incorporated by reference herein.

BACKGROUND

Field of the Invention

The present disclosure relates to a shift device in which a rotation body is rotated to change a shift position

Related Art

In the shift device described in Japanese Patent Application Laid-Open (JP-A) No. 2016-094082, when a knob is disposed in a P position and a brake operation is not being applied, a rotor cam is rotated in one direction and a lock bar is rotated in a lock direction such that a leading end portion of the lock bar is inserted into a recess in the knob to lock rotation of the knob. When the knob is disposed in the P position and the brake operation is applied, the rotor cam is rotated in another direction to release the rotation lock of the knob. A lock sensor detects the position of the lock bar.

In such a shift device, it is preferable that the position of the rotor cam and the lock bar can be detected.

SUMMARY

A shift device capable of detecting positions of a rotation member and a rotation restriction section is provided.

A shift device of a first aspect includes: a rotation body, a shift position being changed by the rotation body being rotated; and a plurality of rotation members, one of which is rotated due to another one being rotated, and that are configured to rotate the rotation body when the rotation members are rotated; a rotation restriction section that is configured to perform restriction of rotation of the rotation body and release of restriction of rotation of the rotation body when the rotation members are rotated; and a detection section that is provided at a rotation member among the plurality of rotation members and that detects a position of the rotation restriction section by detecting a position of the rotation member at which the detection section is provided.

In the shift device of the first aspect, the rotation body is rotated to change a shift position. The plural rotation members are configured such that one of which is rotated due to another one of which being rotated, and the rotation body is rotated when (due to) the respective plural rotation members being rotated. Moreover, the rotation restriction section performs restriction of rotation of the rotation body and release of restriction of rotation of the rotation body when (due to) the rotation members being rotated.

The detection section is provided at a rotation member among the rotation members and detects a position of the rotation restriction section by detecting a position of the rotation member at which the detection section is provided. This enables the position of that rotation member at which the detection section is not provided also to be detected and the position of the rotation restriction section to be detected.

A shift device of a second aspect is the shift device of the first aspect, wherein the rotation body is rotated to a predetermined shift position by the rotation members being rotated.

In the shift device of the second aspect, the rotation body is rotated to the predetermined shift position by the rotation members being rotated. This enables the rotation body to be rotated to the predetermined shift position.

A shift device of a third aspect is the shift device of the first aspect or the second aspect, wherein a rotor cam configures the plurality of rotation members, and the rotation body is rotated to a predetermined shift position by the rotor cam being rotated.

In the shift device of the third aspect, the rotation member is a rotor cam, and the rotation body is rotated to the predetermined shift position by the rotor cam being rotated. This enables the position of the rotor cam to be detected.

A shift device of a fourth aspect is the shift device of any one of the first aspect to the third aspect, wherein: a lock gear configures the plurality of rotation members, the rotation restriction section performs restriction of rotation of the rotation body and release of restriction of rotation of the rotation body by the lock gear being rotated, and the detection section is provided at the lock gear.

In the shift device of the fourth aspect, the rotation member is the lock gear. Rotation of the lock gear causes the rotation restriction section to perform restriction of rotation of the rotation body and release of restriction of rotation of the rotation body. Moreover, the detection section is provided at the lock gear. This enables the position of the rotation restriction section to be precisely detected by detecting the position of the lock gear.

A shift device of a fifth aspect is the shift device of any one of the first aspect to the fourth aspect, wherein the detection section is provided at the rotation member among the plurality of rotation members, that is rotated at reduced speed.

In the shift device of the fifth aspect, the detection section is provided at a rotation member that is rotated at a reduced rotation speed. This enables the position of that rotation member and the position of the rotation restriction section to be precisely detected.

The shift device of the first aspect has the advantageous effect of enabling the position of that rotation member and the rotation restriction section to be detected.

The shift device of the second aspect enables the rotation body to be rotated to the predetermined shift position. The shift device of the third aspect enables the position of the rotor cam to be detected.

The shift device of the fourth aspect enables the position of the rotation restriction section to be precisely detected. The shift device of the fifth aspect enables the position of that rotation member and the position of the rotation restriction section to be precisely detected.

BRIEF DESCRIPTION OF THE DRAWINGS

An exemplary embodiment will be described in detail with reference to the following figures, wherein.

DETAILED DESCRIPTION

Figure 1:
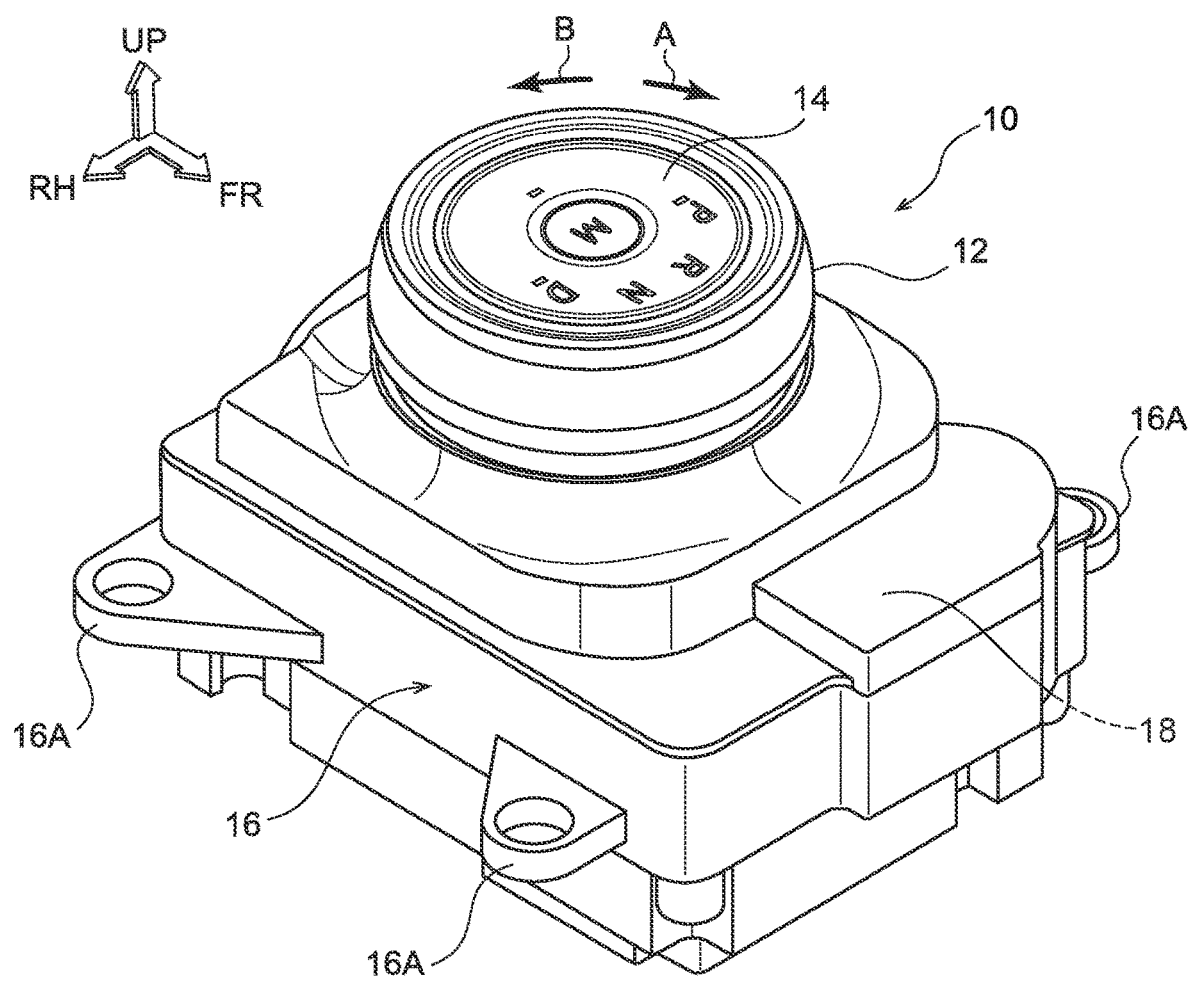
FIG. 1 is a perspective view illustrating a shift device according to an exemplary embodiment.

Detailed explanation follows regarding an exemplary embodiment, with reference to the drawings. FIG. 1 is a perspective view illustrating a shift device 10 according to the present exemplary embodiment, as viewed from an upper side. Note that in the drawings, the arrow FR indicates the front of the shift device 10, the arrow RH indicates the right of the shift device 10, and the arrow UP indicates the upper side of the shift device 10.

The shift device 10 according to the present exemplary embodiment is what is referred to as a by-wire type shift device. The shift device 10 is installed to an instrument panel of a vehicle (automobile), and is disposed at the vehicle front side and vehicle width direction inside of a driving seat in the vehicle (not illustrated in the drawings). The front, right, and upper side of the shift device 10 respectively face obliquely toward the upper front, right, and obliquely toward the upper rear of the vehicle.

The shift device 10 is provided with a knob base 16 that is formed in a box shape. A knob 12, described later, a knob support section 14 that rotatably supports the knob 12, and the like are attached to the knob base 16. The knob base 16 is provided with plural insertion portions 16A into which bolts, not illustrated in the drawings, are inserted. The bolts inserted into the insertion portions 16A are screwed into a shift device fixing section disposed within the instrument panel such that the shift device 10 is fixed to the shift device fixing section. Note that in a state in which the shift device 10 is fixed to the shift device fixing section, the knob 12 projects into the vehicle cabin through an opening formed in the instrument panel.

The substantially cylindrical knob 12, serving as a rotation body, is supported by the knob base 16 so as to be rotatable about (via) the knob support section 14, and the knob 12 is capable of being rotation-operated by an occupant of the vehicle (a driver seated on the driving seat in particular). The knob 12 is capable of rotating in one direction (the arrow A direction) and in another direction (the arrow B direction) within a predetermined range (predetermined angular range). The shift position of the knob 12 is changed by rotating the knob 12 in the one direction or the another direction. In the present exemplary embodiment, the knob 12 is capable of being disposed at a P position (parking position) serving as a predetermined shift position, an R position (reverse position), an N position (neutral position), and a D position (drive position), on progression from the another direction side toward the one direction side.

A shift sensor (not illustrated in the drawings), serving as a shift detection unit, is provided within the knob base 16, and the shift sensor detects the rotation position of a magnet (not illustrated in the drawings) provided at the knob 12 to detect the shift position of the knob 12. The shift sensor is electrically connected to a control device of the vehicle (not illustrated in the drawings), and an automatic transmission of the vehicle (not illustrated in the drawings) is electrically connected to the control device. Changing the shift position of the knob 12 causes the automatic transmission to change to a shift range (a P range (parking range), an R range (reverse range), an N range (neutral range), or a D range (drive range)) corresponding to the shift position of the knob 12 under the control of the control device.

Further, an engine start/stop switch, not illustrated in the drawings, is electrically connected to the control device. An engine is started by an occupant operating the engine start/stop switch in a state in which the engine has been stopped. On the other hand, the engine is stopped by the occupant operating the engine start/stop switch in a state in which the engine is running.

Moreover, a detection unit for detecting whether or not a brake, serving as a braking section of the vehicle, is being operated (applied) by the occupant is electrically connected to the control device. The vehicle is braked when the occupant operating (applying) the brake.

Figure 2:
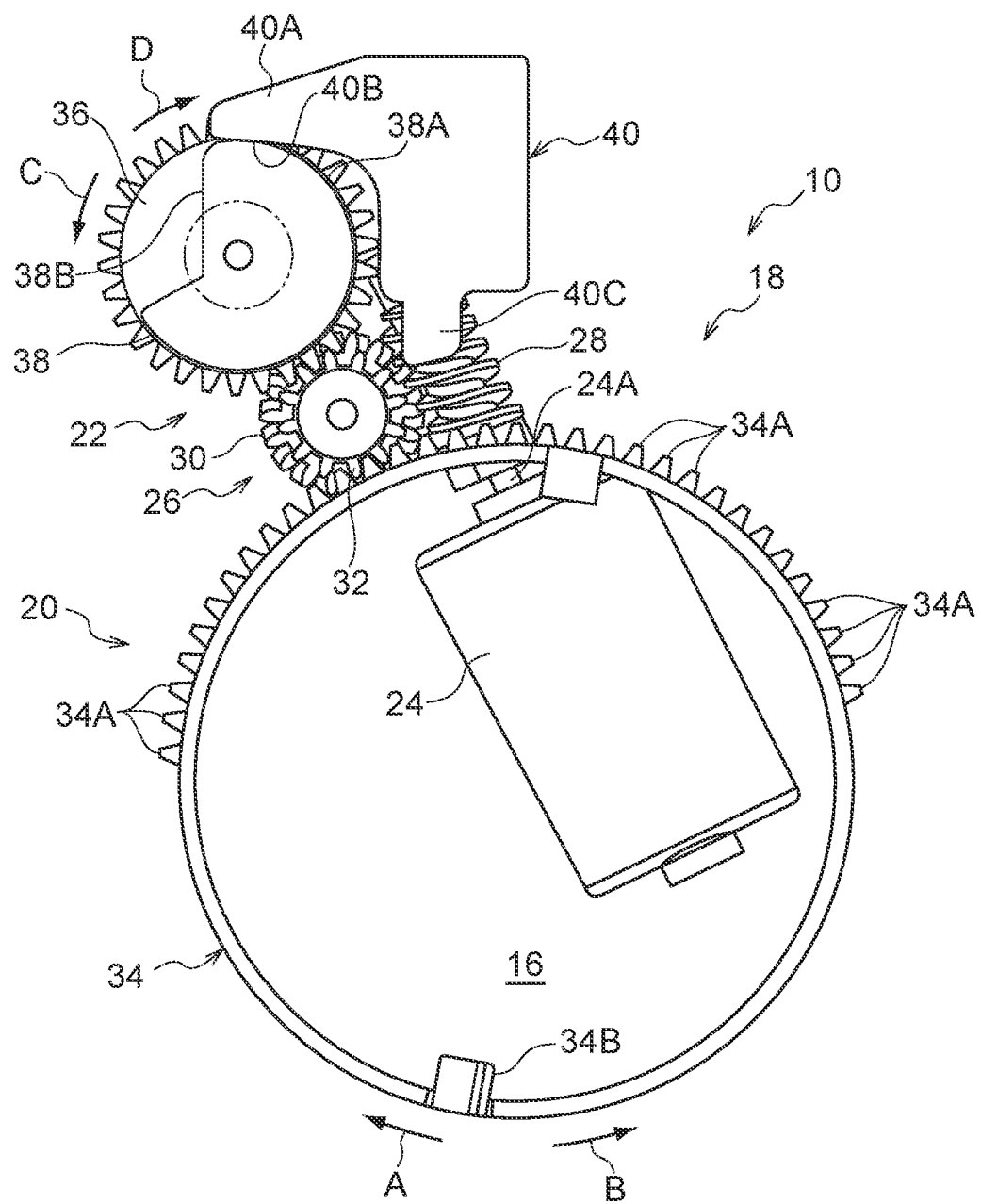
FIG. 2 is a plan view illustrating relevant portions of a shift device.
Figure 3:
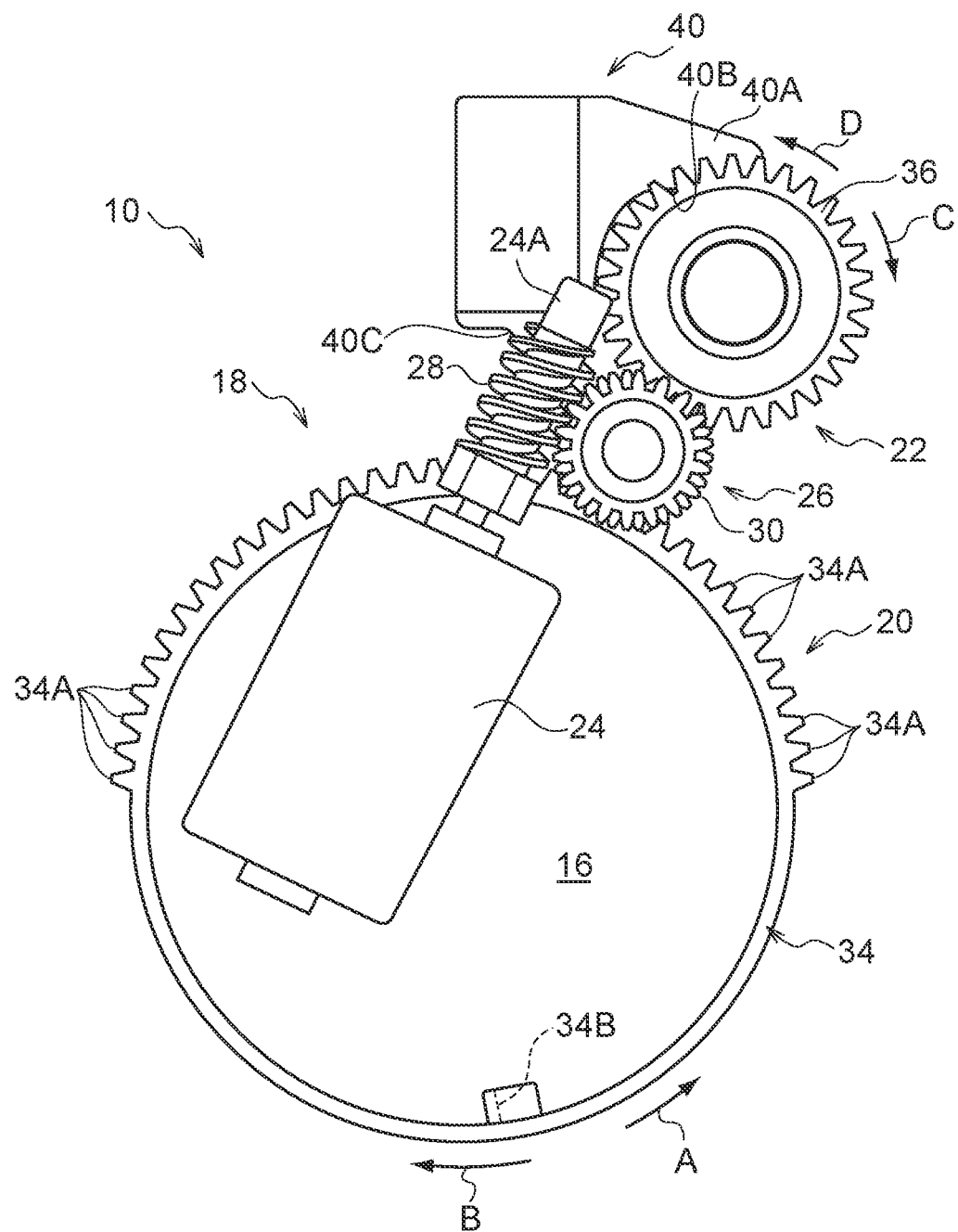
FIG. 3 is a lower face view illustrating relevant portions of a shift device.
Figure 4:
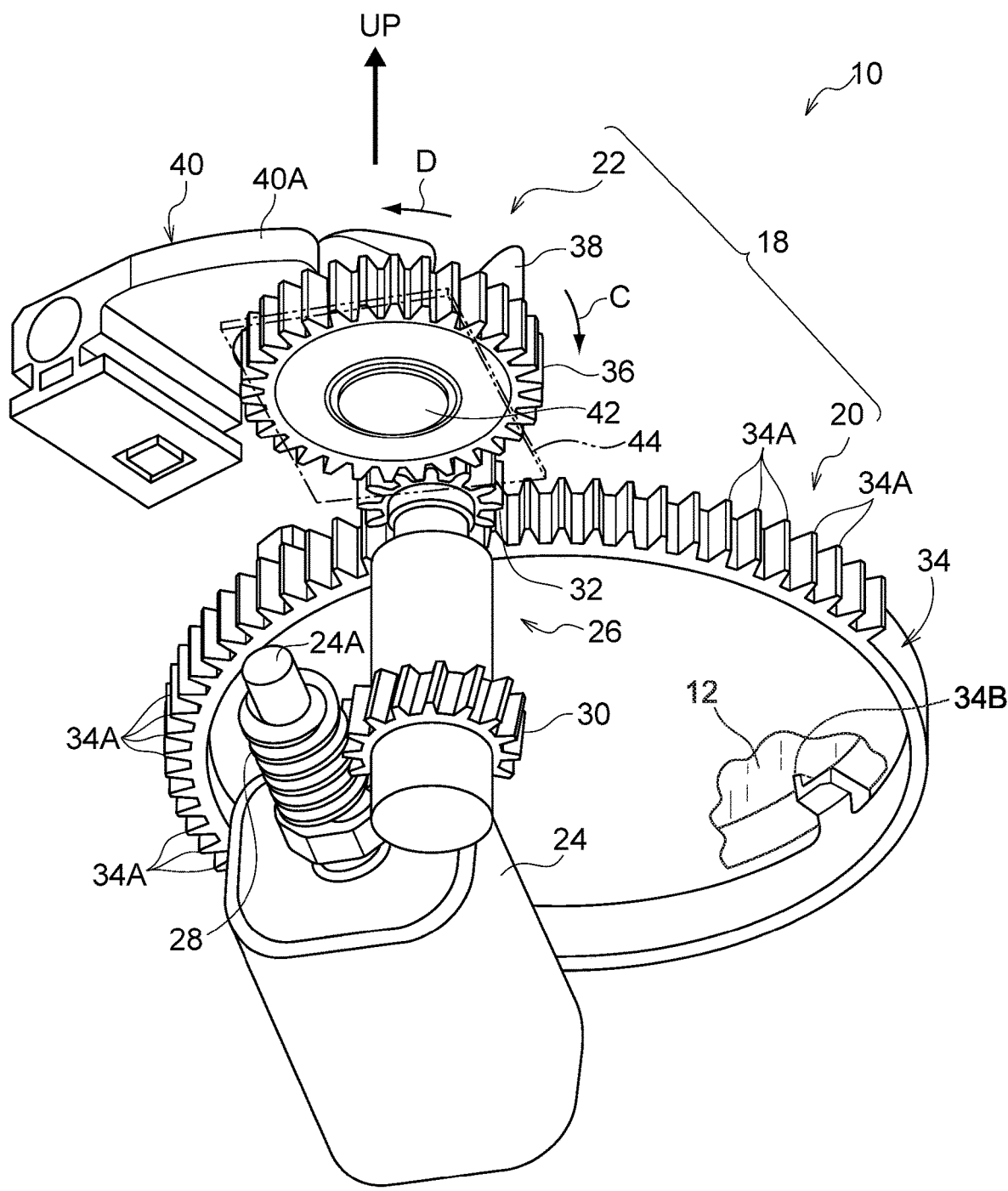
FIG. 4 is a perspective view illustrating relevant portions of a shift device, as viewed obliquely from below.

Next, an operation mechanism 18, serving as an operation unit, will be described. FIG. 2 illustrates the operation mechanism 18 in plan view, and FIG. 3 illustrates the operation mechanism 18 as viewed from below. FIG. 4 illustrates the operation mechanism 18 in perspective view, as viewed obliquely from below.

The operation mechanism 18 is provided within the knob base 16. As illustrated in FIG. 2 to FIG. 4, the operation mechanism 18 is configured including an autocorrect mechanism 20 and a shift-lock mechanism 22.

The autocorrect mechanism 20 is configured including a motor 24, serving as a drive unit, and a transmission mechanism 26 for transmitting drive force from the motor 24 to the knob 12. A direct current motor that includes a rotation shaft 24A, serving as a rotation member that is rotated by passing current through, is used for the motor 24, and the motor 24 is electrically connected to the control device. The motor 24 is disposed at a lower side of the knob 12 and the knob support section 14 (see FIG. 1) (one side in rotation axial direction of the knob 12 with respect to the knob 12) in a state in which the axial direction of the rotation shaft 24A is at a right angle to the rotation axial direction of the knob 12. Further, the motor 24 is controlled by the control device such that the rotation shaft 24A rotates in a forward rotation direction and a reverse rotation direction.

The transmission mechanism 26 is configured including a worm gear 28, serving as a rotation member provided at the rotation shaft 24A of the motor 24, a helical gear 30, serving as rotation member that meshes with the worm gear 28; an intermediate gear 32, serving as a rotation member that rotates integrally with (as a unit with) the helical gear 30; and a rotor cam 34, serving as a rotation member.

The rotor cam 34 is formed in a substantially circular cylinder shape with a larger diameter than that of the intermediate gear 32. The rotor cam 34 is disposed below the knob 12 such that an axis line of the rotor cam 34 is on the axial line of the knob 12, and the rotation position of the rotor cam 34 is disposed at a defined rotation position. Outer teeth 34A that mesh with the intermediate gear 32 are formed on an outer circumferential portion of the rotor cam 34. In the present exemplary embodiment, the outer teeth 34A are formed at a predetermined range in a rotation circumferential direction of the rotor cam 34. A rotation plate 34B that projects from the rotor cam 34 toward inside in a radial direction of rotation of the rotor cam 34 and toward upward is formed at a location on the outer circumferential portion of the rotor cam 34 where the outer teeth 34A are not formed.

In the autocorrect mechanism 20, rotation of the rotation shaft 24A of the motor 24 is transmitted to the rotor cam 34 through the worm gear 28, the helical gear 30, and the intermediate gear 32, thereby rotating the rotor cam 34. When the motor 24 is rotated in the another direction (the arrow B direction), the rotation plate 34B of the rotor cam 34 abuts a predetermined location of the knob 12, the rotation of the rotor cam 34 is thereby transmitted to the knob 12 such that the knob 12 rotates.

The shift-lock mechanism 22 is provided with a lock gear 36, this being a spur gear serving as a rotation member. The lock gear 36 is configured smaller in diameter than the rotor cam 34 yet larger in diameter than the intermediate gear 32. The lock gear 36 meshes with the intermediate gear 32 on the opposite side to the rotor cam 34. Thus, due to rotation of the intermediate gear 32, the lock gear 36 is rotated at a reduced speed, together with the rotor cam 34, and rotation of the rotor cam 34 in the one direction (arrow A direction) or the another direction (arrow B direction) respectively rotates the lock gear 36 in a lock direction (arrow D direction) or a lock release direction (arrow C direction).

A cam 38, serving as a restriction portion and a restriction release portion, is integrally provided at an upper face of the lock gear 36, and the cam 38 rotates integrally with (as a unit with) the lock gear 36. The cam 38 projects from an upper face of the lock gear 36 toward the upper side, and a cam face 38A and a cam face 38B are formed on the outer circumference of the cam 38. The radial dimension of the cam face 38A is substantially constant and slightly smaller than the radial dimension of a tooth bottom face of the lock gear 36. The cam face 38A is formed spanning substantially half the circumference of the cam 38. Further, the cam face 38B is continuous with an end portion in a lock release direction (lock release direction of the lock gear 36) of the cam face 38A, and the radial dimension of the cam face 38B decreases on progression away from the cam face 38A in the lock release direction.

A block shaped lock bar 40, serving as a rotation restriction section, is provided at the shift-lock mechanism 22. A length direction of the lock bar 40 is configured substantially in a radial direction of the rotor cam 34 (knob 12) (for example, in the exemplary embodiment, substantially in a direction from the lock bar 40 toward a rotation center of the rotor cam 34 (up-down direction in FIG. 2)), and the lock bar 40 is supported, at the upper side of the lock gear 36, by the knob base 16 so as to be capable of moving substantially in the radial direction of the rotor cam 34 (knob 12). A substantially triangular slide projection 40A is integrally provided to the lock bar 40. The slide projection 40A projects from a base portion of the lock bar 40 and faces the circumferential face of the cam 38 (the cam faces 38A and 38B) on the opposite side to the rotor cam 34.

A face on the cam 38 side of the slide projection 40A is substantially orthogonal to the radial direction mentioned above of the rotor cam 34, and the face on the cam 38 side of the slide projection 40A is configured by a contact face 40B.

On the opposite side of the lock bar 40 to the rotor cam 34, a coil spring (compression spring, not illustrated in the drawings), serving as an urging unit, is provided. The lock bar 40 is urged toward the radial inside of the rotor cam 34 by the coil spring such that the contact face 40B of the slide projection 40A is abutted by the circumferential face of the cam 38 (the cam faces 38A and 38B).

As illustrated in FIG. 2, a rectangular column shaped lock projection 40C, serving as a restriction portion, is integrally provided to the lock bar 40. The lock projection 40C projects from the base portion of the lock bar 40 toward the radial inside of the rotor cam 34 (knob 12). In an engagement state of the lock bar 40 in which the contact face 40B of the slide projection 40A is abutted the cam face 38A of the cam 38, the lock projection 40C is separated from the rotor cam 34 (knob 12) against the urging force from the coil spring. In an engagement-released state of the lock bar 40 in which the contact face 40B of the slide projection 40A is abutted the cam face 38B of the cam 38 as a result of the cam 38 being rotated in the lock direction integrally with (as a unit with) the lock gear 36, the lock projection 40C moves toward the rotor cam 34 (knob 12) side due to the urging force from the coil spring. A lock hole (not illustrated in the drawings) is formed at an outer circumferential portion at a lower end portion of the knob 12 (see FIG. 4) disposed at the upper side of the rotor cam 34. In the engagement-released state of the lock bar 40, the lock projection 40C enters the lock hole of the knob 12, and the lock bar 40 (lock projection 40C) thereby restricts the knob 12 from rotating.

As illustrated in FIG. 3 and FIG. 4, a circular plate shaped magnet 42, serving as a detection section (a portion or member which is an object to be detected, or a portion or member which generates object to be detected (for example, magnetic field), or the like), is provided at a lower face of the lock gear 36. The magnet 42 is disposed coaxially to the lock gear 36 and is fixed to the lower face of the lock gear 36. The magnet 42 rotates integrally with (as a unit with) the lock gear 36.

As illustrated in FIG. 4, at the lower side of the lock gear 36, a sensor substrate 44 (not illustrated in FIG. 2 nor in FIG. 3), serving as a detection unit, is provided. The sensor substrate 44 faces the magnet 42. One side from a center position of the magnet 42 is magnetized as an N-pole, and another side from the center position of the magnet 42 is magnetized as an S-pole. The orientation of the magnetic field (polarity) and the strength of the magnetic field (magnetic flux density) change in the circumferential direction of the magnet 42.

At the sensor substrate 44, a magnetism sensor (not illustrated in the drawings) using a Hall element (sensor) (Hall IC) or the like is provided, and the magnetism sensor faces an outer circumferential portion of the magnet 42. The sensor substrate 44 outputs an electric signal (an analog or digital voltage signal) proportional to the magnetic field (magnetic flux density including the orientation of magnetic field line) of the magnet 42 detected by the magnetism sensor.

The sensor substrate 44 is connected to the control device. In the control device, the rotation position of the magnet 42 is determined (detected) from the electric signal output by the sensor substrate 44. In the control device, the rotation position of the lock gear 36 and the rotation position of the cam 38 are detected from the rotation position of the magnet 42, and the rotation position of the intermediate gear 32 and the rotation position of the rotor cam 34 are also detected. In the control device, the movement position of the lock bar 40 (lock position or lock-release position) is detected from the rotation position of the cam 38.

Next, explanation is given regarding operation of the present exemplary embodiment.

In the shift device 10 described above, in a case in which the knob 12 is disposed at the P position (in a case in which the shift sensor has detected that the shift position of the knob 12 is the P position) and the brake is not being operated (applied), in the autocorrect mechanism 20 of the operation mechanism 18, under the control of the control device, the motor 24 is driven so as to rotate in reverse such that the rotor cam 34 is rotated in the arrow A direction through the worm gear 28, the helical gear 30, and the intermediate gear 32.

Further, in the shift-lock mechanism 22 of the operation mechanism 18, when the motor 24 is driven so as to rotate in reverse, the lock gear 36 is rotated in the arrow D direction through the worm gear 28, the helical gear 30, and the intermediate gear 32, and the cam 38 is rotated in the engagement-released direction (in a direction to release the engagement with the lock bar 40) (the arrow D direction). Thus, when the cam face 38B of the cam 38 faces the contact face 40B of the lock bar 40, the lock bar 40 is moved toward the radial inside of the knob 12 under the urging force from the coil spring, so the lock bar 40 is made to be the engagement-released state, duethereto, the lock projection 40C enters the lock hole of the knob 12, thereby restricting the knob 12 from rotating. Note that when the lock gear 36 is rotated such that the cam 38 is at an engagement-released position with respect to the lock bar 40, driving of the motor 24 so as to rotate in reverse is stopped under the control of the control device.

On the other hand, in a case in which the knob 12 is disposed at the P position and the brake is being operated (applied), in the autocorrect mechanism 20 of the operation mechanism 18, the motor 24 is driven so as to rotate forward under the control of the control device in order to rotate the rotor cam 34 in the arrow B direction through the worm gear 28, the helical gear 30, and the intermediate gear 32. Note that when, as a result of rotating the rotor cam 34, the rotation position of the rotor cam 34 has been detected to be the rotation restriction position, the forward-rotation drive of the motor 24 is stopped under the control of the control device.

Further, in the shift-lock mechanism 22, when the motor 24 is driven so as to rotate forward, the lock gear 36 rotates in the arrow C direction through the worm gear 28, the helical gear 30, and the intermediate gear 32 such that the cam 38 is rotated in the engagement state direction (in a direction to engage with the lock bar 40 (the arrow C direction). Accordingly, when the cam face 38A of the cam 38 faces the contact face 40B of the lock bar 40, the lock bar 40 moves toward the radial outside of the knob 12 against the urging force of the coil spring and the lock bar 40, so the lock bar 40 is made to be the engagement state, duethereto, the lock projection 40C is accordingly pulled out from the lock hole of the knob 12, releasing the rotation restriction on the knob 12.

Further, in a case in which the knob 12 is disposed in a shift position other than the P position (the R position, the N position, or the D position) (in a case in which the shift sensor has detected that the shift position of the knob 12 is a position other than the P position), when the engine start/stop switch is operated to stop the engine, the shift range of the automatic transmission is changed to the P range under the control of the control device. Moreover, this state in which the shift range of the automatic transmission has been changed to the P range is maintained until the engine start/stop switch is next operated to start the engine and the knob 12 is then rotated to a shift position other than the P position (the shift sensor detects that the shift position of the knob 12 has been changed to a position other than the P position). Thus, when the engine start/stop switch has been operated, the shift range of the automatic transmission is always set to the P range.

In a case in which the knob 12 is disposed at a shift position other than the P position, when the engine start/stop switch is operated (a predetermined occasion, this being when at least one of stopping or starting of the engine has been performed), in the autocorrect mechanism 20 of the operation mechanism 18, the motor 24 is driven so as to rotate in forward under the control of the control device to rotate the rotor cam 34 in the arrow B direction. Thus, the rotation plate 34B of the rotor cam 34 abuts the predetermined location of the knob 12 and the knob 12 is rotated in the arrow B direction. The knob 12 is thereby rotated to the P position. This enables the knob 12 to be disposed in (returned to) the P position, enabling the shift position of the knob 12 and the shift range of the automatic transmission to be made to match (be the same) each other when the engine start-stop switch has been operated. Note that in the shift-lock mechanism 22, the motor 24 is driven so as to rotate in forward to rotate the cam 38 in the lock release direction (the arrow C direction), duethereto, the cam face 38B of the cam 38 is maintained in a state facing the contact face 40B of the lock bar 40 and the lock bar 40 is maintained in the engagement-released state.

When the knob 12 has been rotated to the P position (when the shift sensor has detected that the shift position of the knob 12 is the P position), the motor 24 is driven so as to rotate in reverse under the control of the control device to rotate the rotor cam 34 in the arrow A direction. Moreover, when the rotor cam 34 is detected as having rotated to the defined rotation position, the reverse rotation drive of the motor 24 is stopped under the control of the control device. Thus, due to the rotation plate 34B of the rotor cam 34 moving away from the predetermined location of the knob 12, the rotation plate 34B of the rotor cam 34 is incapable of abutting the predetermined location of the knob 12 even if the knob 12 is rotated from the P position to the D position. Note that in the shift-lock mechanism 22, even when the motor 24 is driven so as to rotate in reverse to rotate the cam 38 in the lock direction (the arrow D direction), the cam face 38B of the cam 38 is maintained in the state facing the contact face 40B of the lock bar 40, and the lock bar 40 is maintained in the engagement-released state.

In the operation mechanism 18, due to the motor 24 being driven, rotation of the rotation shaft 24A is transmitted to the worm gear 28, the helical gear 30, the intermediate gear 32, the rotor cam 34, and the lock gear 36, and the worm gear 28, the helical gear 30, the intermediate gear 32, the rotor cam 34, and the lock gear 36 are rotated together with the rotation shaft 24A. Due to the lock gear 36 being rotated, the cam 38 and the magnet 42 rotate, and the lock bar 40 is moved to a rotation restriction position where rotation of the knob 12 is restricted by the lock projection 40C or a restriction release position of rotation of the knob 12. Moreover, the rotation position of the magnet 42 is detected by the control device.

Thus, the rotation position of the lock gear 36 and the rotation position of the cam 38, and hence the movement position of the lock bar 40 can be detected from the rotation position of the magnet 42. The rotation position of the rotor cam 34 can also be detected from the rotation position of the magnet 42. Accordingly, whether or not the rotation position of the rotor cam 34 has reached the defined rotation position can be detected, and whether or not the knob 12 that has been rotated by the rotor cam 34 has rotated to the P position, can be detected from the rotation position of the magnet 42.

Whether or not, with respect to the lock bar 40, the cam 38 is in the engagement position, and whether or not the cam 38 is in the engagement-released position, can be detected from the rotation position of the magnet 42, enabling the reverse-rotation drive of the motor 24 to be stopped and enabling the forward-rotation drive of the motor 24 to be stopped. Moreover, the position of the lock bar 40 can be detected with high precision since the cam 38 is integrally provided to the lock gear 36 that is provided with the magnet 42. The lock gear 36 is rotated at a reduced speed by the worm gear 28, the helical gear 30, and the intermediate gear 32. Thus, the rotation position of the magnet 42 of the lock gear 36 can be detected with high precision, enabling the position of the lock bar 40 to be detected with even higher precision.

Detection of the rotation position of the rotor cam 34 and detection of the movement position of the lock bar 40 can be performed using the magnet 42 provided to the lock gear 36, enabling detection sections for detection of the rotation position of the rotor cam 34 and detection of the movement position of the lock bar 40 to be omitted. Moreover, in a case in which magnet is used as detection section, due to being able to reduce detection sections, enabling the generation of magnetic force in the shift device 10 to be suppressed and enabling the magnetic field to be suppressed. Therefore, enabling other magnetic fields to be suppressed from affecting the detection of the rotation position of the rotor cam 34 and the movement position of the lock bar 40. Moreover, variance arising in the detection of the rotation position of the rotor cam 34 and the movement position of the lock bar 40 can be suppressed, the control logic of the operation mechanism 18 can be simplified, and the bulk (size) of the shift device 10 can be reduced.

Note that in the present exemplary embodiment, the magnet 42 serving as the detection section is provided to the lock gear 36 (including the cam 38). However, the detection section is not limited to the magnet 42, and the detection section may be applied with any configuration capable of detecting the rotation position of the lock gear 36 by being detected. The detection section is not limited to provide to the lock gear 36, and may be provided to the rotor cam 34, or may be provided to any one of the rotation shaft 24A of the motor 24, the worm gear 28, the helical gear 30, or the intermediate gear 32.

It is preferable in the present exemplary embodiment that the magnet 42 is provided at only one of the lock gear 36, the rotor cam 34, the rotation shaft 24A of the motor 24, the worm gear 28, the helical gear 30, the intermediate gear 32 (in the present exemplary embodiment, the magnet 42 is provided at only the lock gear 36 among the plural rotation members). Namely, it is preferable that the detection section is provided at only one rotation member among plural rotation members which are configured such that rotation force of the motor 24 is transmitted.

Moreover, in the present exemplary embodiment, explanation has been given of an example in which the shift device 10 is provided at the instrument panel of the vehicle. However, there is no limitation thereto. The shift device may be provided at the floor of the vehicle, or may be provided at the column (steering column) of the vehicle.

What is claimed is:

1. A shift device comprising:
    a rotation body, a shift position being changed by the rotation body being rotated; and
    a plurality of rotation members, one of which is rotated due to another one being rotated, and that are configured to rotate the rotation body when the rotation members are rotated;
    a lock gear;
    a rotation restriction section that is configured to perform restriction of rotation of the rotation body and release of restriction of rotation of the rotation body when the lock gear is rotated; and
    a detection section that is provided at the lock gear and that detects a position of the rotation restriction section by detecting a position of the lock gear,
    wherein a cam portion having a cam face is integrally provided at an axial end face of and is rotated integrally with said lock gear, the detection section being fixed to the lock gear, and
    wherein the rotation restriction section is abutted by the cam face so as to restrict rotation of the rotation body and release restriction of rotation of the rotation body by the rotation restriction section being moved with respect to the rotation body when the lock gear is rotated, and
    wherein a center axis of rotation of the rotation body is parallel to a center axis of rotation of the lock gear.

2. The shift device of claim 1, wherein the rotation body is rotated to a predetermined shift position by the rotation members being rotated.

3. The shift device of claim 1, wherein one of the rotation members, and the rotation body is rotated to a predetermined shift position by a rotor cam being rotated.

4. The shift device of claim 3, wherein the rotor cam is disposed coaxially with the rotation body.

5. The shift device of claim 1, wherein the lock gear is rotated at reduced speed.

6. The shift device of claim 1, wherein the rotation restriction section performs restriction of rotation of the rotation body and release of restriction of rotation of the rotation body by the rotation restriction section being moved linearly due to rotation of the lock gear.

7. The shift device of claim 1, wherein the restriction section includes a lock projection that is moved into and out of locking engagement with the rotation body by the engagement between the cam face of the cam portion and the restriction section.

8. The shift device of claim 6, wherein the restriction section includes a lock projection that is moved into and out of locking engagement with the rotation body by the engagement between the cam face of the cam portion and the restriction section.

* * * * *